Oct. 4, 1960  F. M. JOHNSON  2,954,948
CHAFF DISPENSING SYSTEM
Filed April 10, 1956  4 Sheets-Sheet 1
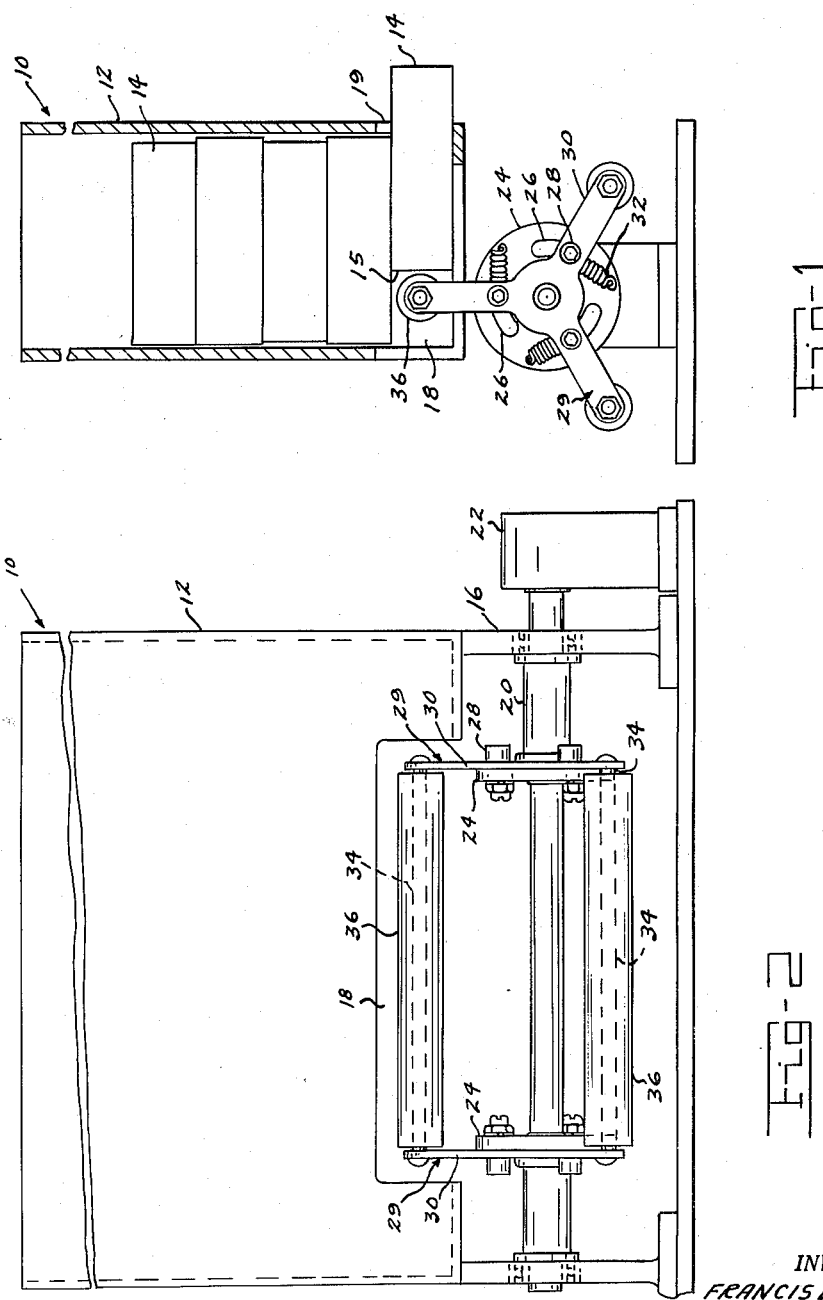
INVENTOR.
FRANCIS M. JOHNSON
BY
ATTORNEYS Oct. 4, 1960  F. M. JOHNSON  2,954,948
CHAFF DISPENSING SYSTEM
Filed April 10, 1956  4 Sheets-Sheet 2
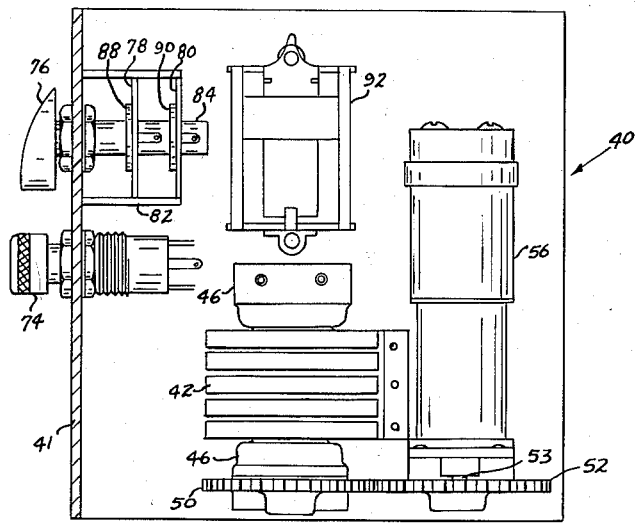
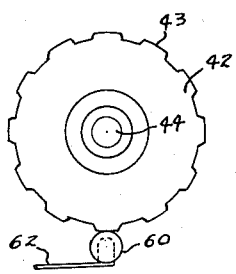
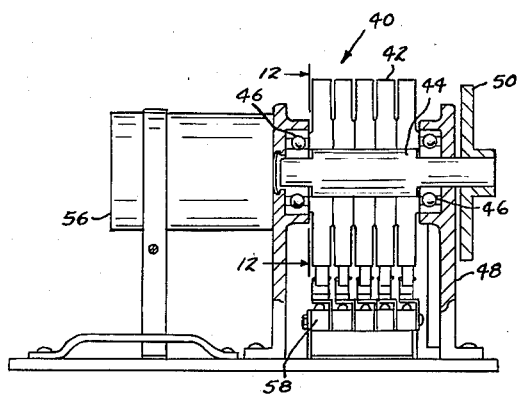
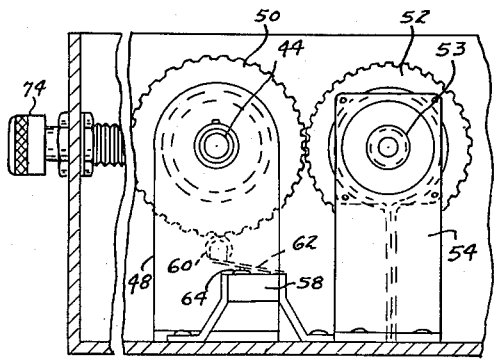
INVENTOR.
FRANCIS M. JOHNSON
BY
ATTORNEYS

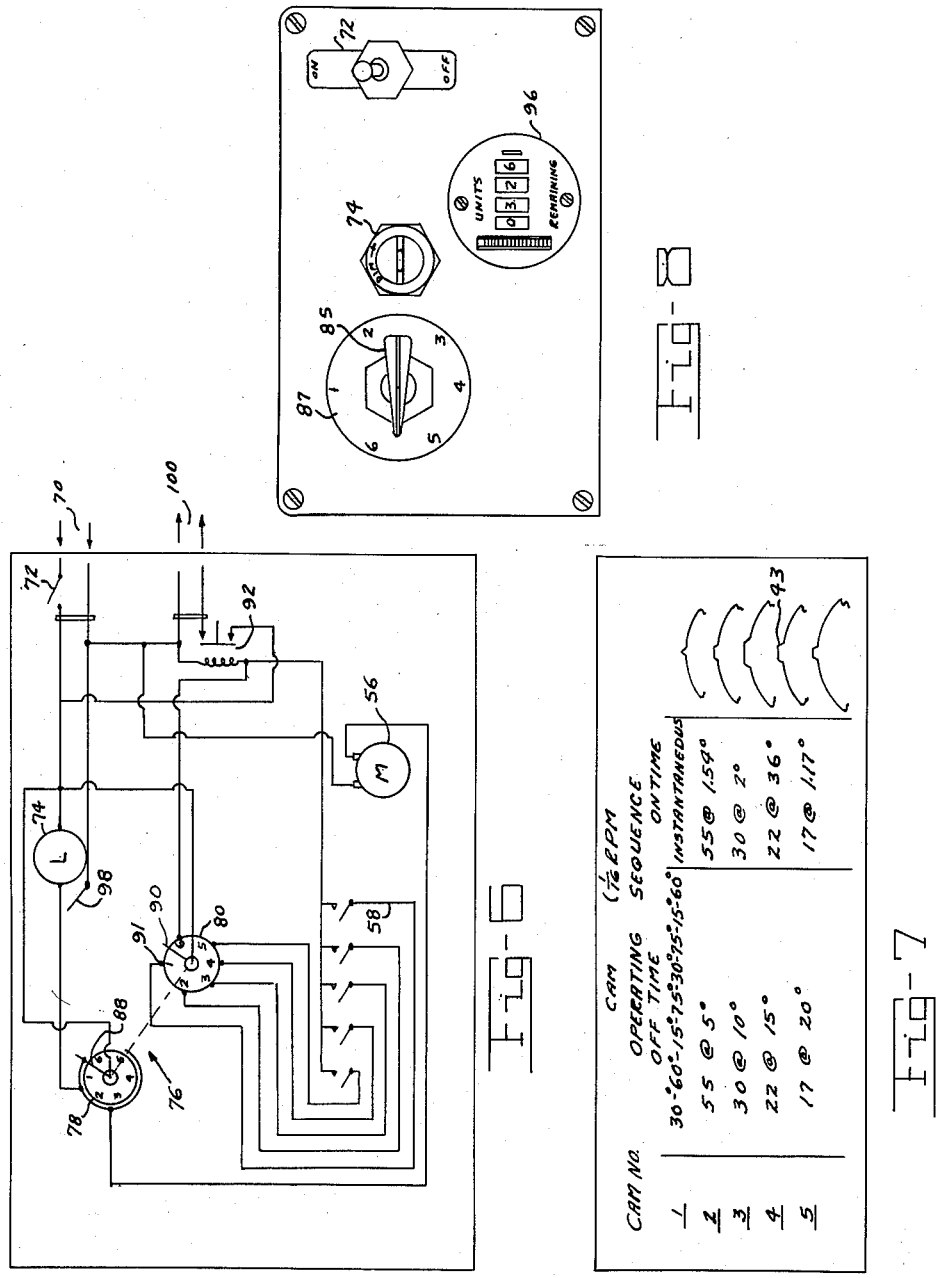

Oct. 4, 1960 F. M. JOHNSON 2,954,948
CHAFF DISPENSING SYSTEM
Filed April 10, 1956 4 Sheets-Sheet 4
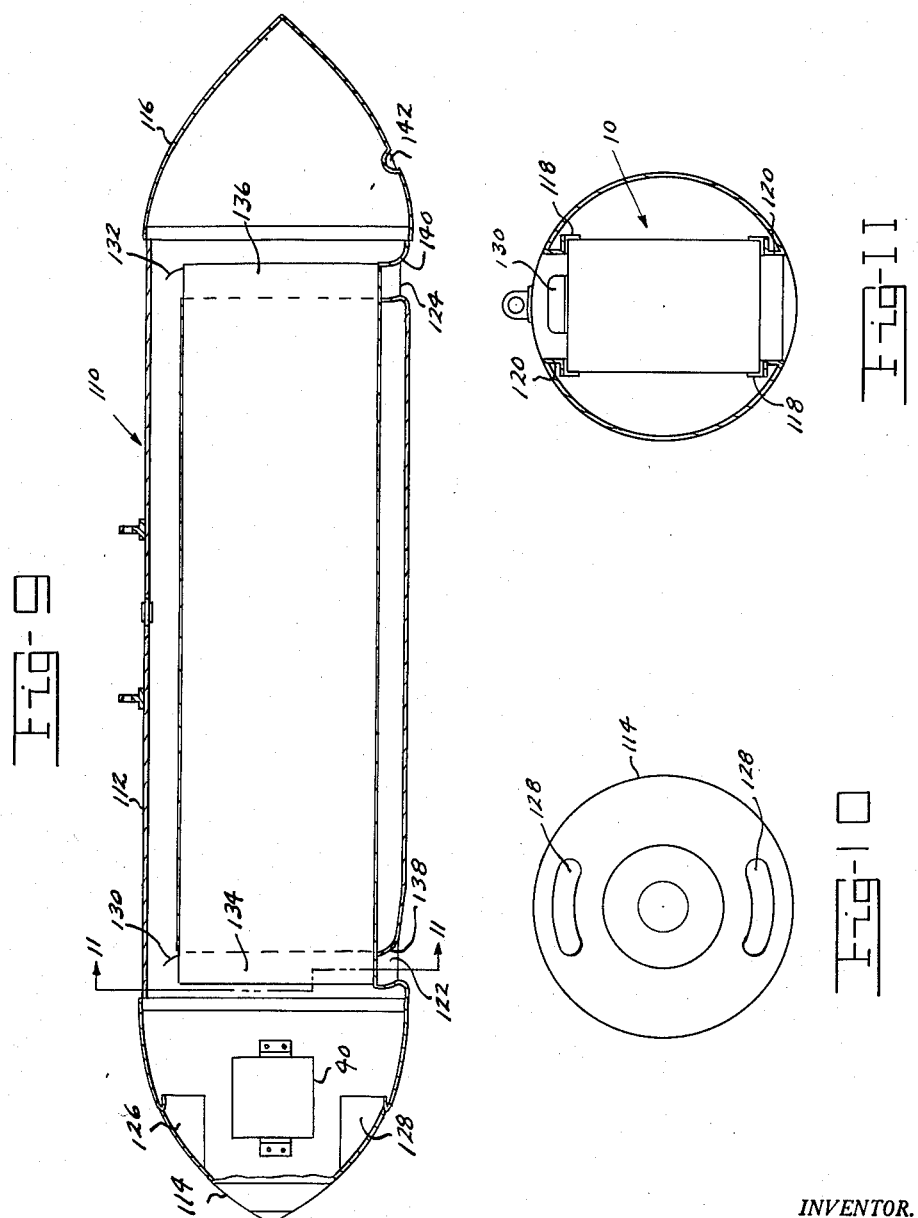
INVENTOR.
FRANCIS M. JOHNSON
ATTORNEYS United States Patent Office 2,954,948
Patented Oct. 4, 1960

2,954,948
CHAFF DISPENSING SYSTEM

Francis M. Johnson, Dayton, Ohio, assignor to the United States of America as represented by the Secretary of the Air Force Filed Apr. 10, 1956, Ser. No. 577,425

8 Claims. (Cl. 244—136)

(Granted under Title 35, U.S. Code (1952), sec. 266)

The invention described herein may be manufactured and used by or for the United States Government for governmental purposes without payment to me of any royalty thereon.

This invention relates to a dispensing system and, more particularly, to a dispensing system for ejecting packages of chaff in predetermined intervals and in predetermined quantities.

Chaff is a material which has radar reflecting properties. In time of war it is used to confuse radar detection devices. By dropping this material from an aircraft at regular intervals and in predetermined quantities, a small group of airplanes can simulate the approach of a much larger group on an enemy radar detection screen. The time differences between the chaff dispensing intervals along with the amount of chaff to be dropped are dependent on the speed of the airplane, and the particular mission involved. Accordingly, a chaff dispensing system must be sufficiently flexible to be able to conveniently take into account varying aircraft speeds and mission requirements.

In its preferred embodiment, this chaff dispensing system includes an upstanding container having a chaff dispensing opening at the bottom. The container holds a stack of boxes or packages of chaff which are to be dispensed. A plurality of pushing members or arms mounted on a support shaft, are rotatably driven to successively engage these boxes of chaff and to force them through the opening at the bottom of the container after which the boxes open and distribute the chaff in the air stream.

In this embodiment, and in other dispensing systems having design limitations which prevent the push members from having a traverse sufficient to push the material being dispensed completely out of the dispenser container, and where the frictional resistance of the material being dispensed decreases after it is moved a certain portion of the distance necessary to leave the container, means are connected to each of the push members for storing a portion of the energy supplied to it when it is being actuated. This stored energy is released to the push member at some point in its traverse, which is designed to be at the point where the frictional resistance that the material being dispensed offers to displacement, decreases. This release of stored energy causes the push member to move and kick this material the balance of the distance required to eject it completely from the container or dispenser.

It will be appreciated that large quantities of chaff must be carried by aircraft on radar deception missions and that military needs may require that on a return from such a mission, the aircraft be re-supplied in the shortest possible time. Previously, chaff had been carried internally in the aircraft wing or fuselage and resupply was awkward and time consuming. In this embodiment, the chaff dispensers are removably mounted in external wing tanks more or less permanently fixed to the wing. These wing tanks comprise removable front and rear caps and intermediate portions which come in various lengths. The size of the intermediate portion which is secured to the wing of an aircraft, depends on the size of the aircraft and mission requirements. The intermediate portion of the wing tank is adapted to removably receive a complete chaff dispenser, so that on return from a mission it is only necessary to remove an end cap and withdraw the entire exhausted chaff dispenser, and substitute one of like size that is fully loaded. In this way an aircraft can be made ready for another mission in a very short time.

An intervalometer is preferably permanently mounted in one of the caps of the wing tank and is connected to the dispensing apparatus so chaff can be dispensed in any predetermined interval and in any predetermined quantity. In the preferred embodiment, this intervalometer comprises a plurality of spaced parallel cam disks mounted for rotation on a common shaft. These cam disks have raised cam surfaces uniformly disposed on their periphery. The length of these cam surfaces and the peripheral distance between them is different for each disk. A microswitch is associated with each cam disk and is positioned to be closed by contact with these cam surfaces. Switching means permit any chosen microswitch to be energized so that the dispensing apparatus which is controlled by the microswitch that has been energized will be actuated when that microswitch is closed.

Accordingly, a principal object of this invention is to provide a dispensing apparatus with control means that cause the dispensing apparatus to dispense material in predetermined intervals and in predetermined quantities.

A further object of this invention is to provide pushing means for displacing an object a predetermined distance where the pushing means has a traverse less than the distance the object is to be displaced.

An additional object of this invention is to provide an improved material dispensing apparatus provided with means for storing a stack of material to be dispensed, and an improved pushing member for dispensing material from the stack.

Still another object of this invention is to provide a dispensing apparatus with an improved push member having means for storing a portion of the energy supplied to it when it is being actuated and releasing this stored energy at some point in its traverse to cause the push member to move and kick the material being dispensed completely out of the dispensing apparatus.

A further object of this invention is to provide a dispensing apparatus with a cam actuated switch control system that is simple to construct, reliable, and inexpensive to manufacture.

A further object of this invention is to provide a container for a complete chaff dispensing system, having means for permitting the quick and convenient removal of the entire chaff dispensing system from the container when its magazine is exhausted and replacing it with one that is fully loaded.

Still another object of this invention is the provision of a wing tank adapted to removably retain a complete chaff dispenser and which is provided with fluid utilizing means which cooperate with the shaff dispenser to eject chaff from the wing tank.

These and other objects of the invention will become more apparent when read in the light of the accompanying drawing and specification in which like reference characters refer to like parts of the several figures.

Referring now to the drawing:

Fig. 1 is an end elevation partly in section of the chaff dispenser.

Fig. 2 is a front view of the chaff dispenser.

Fig. 3 is a plan view of the intervalometer used to control the chaff dispenser.

Fig. 4 is a side view, partly in section, of the intervalometer.

Fig. 5 is a detail of the end view of the intervalometer partly in section.

Fig. 6 is a circuit diagram of the intervalometer.

Fig. 7 is a table disclosing the shape of the various cams on the cam disks in the intervalometer, and showing how these cams are distributed on the periphery of these disks.

Fig. 8 is a view of the control panel of the intervalometer.

Fig. 9 is a side elevation of a wing tank container for holding complete chaff dispensers.

Fig. 10 is a front elevation of a wing tank container disclosing the air intake ports.

Fig. 11 is a sectional view taken on the line 11—11 in Fig. 9, disclosing the way the chaff dispensers are removably supported on mounting runners secured to the wing tanks.

Fig. 12 is a fragmentary view showing how the microswitch actuating wheel and the wheel support are mounted to roll over the cam surfaces on the periphery of the cam disks.

Referring now to Figs. 1 and 2 of the drawing, the chaff dispenser indicated generally at 10 comprises an upstanding container 12 for holding a stack of boxes or packages of chaff 14. The chaff container or magazine 12 is mounted on the support 16 and has an opening 18 at its bottom for purposes to be described below. A shaft 20 is rotatably mounted in bearings in support 16 and is driven by a motor 22, see Fig. 2. A pair of identical disks or spider supports 24 is rigidly secured to shaft 20 in spaced parallel relation to each other, see Fig. 2. A spider 30 is rotatably mounted on each spider support 24. Guide pins 28 rigidly secured to the arms 29 of the spider 30 ride in arcuate guide slots 26 in spider support 24 to limit the rotation of the spider 30 with respect to the spider support 24, see Fig. 1. Coil springs 32 are connected between pins 28 on the arms 29 of spider 30 and spider support 24 for purposes to be described below. Connecting rods 34 in spaced parallel relation to each other and to shaft 20 are rigidly connected to corresponding arms 29 on spiders 30 to cause the spiders to rotate together, see Fig. 2. Push members 36 are freely rotatable on connecting rods 34 and are concentric therewith.

In operation when motor 22 is energized, shaft 20 rotates and causes spider supports 24, spiders 30 and push arms 36 to rotate along with it. The length of the arms 29 on spiders 30 is such that when the spider rotates, push members 36 enter into the opening 18 at the bottom of the container or magazine 12 and contact an edge 15 of the box 14 of chaff at the bottom of the stack, see Fig. 1. The frictional resistance the box of chaff offers to displacement is proportional to the weight of the boxes of chaff resting on it and to its own weight. As can be seen by an inspection of Fig. 1, the frictional resistance to displacement offered by a box of chaff being pushed out of the opening 18 in container 12 will remain substantially constant until the box 14 is almost completely out of the container, at which time the frictional resistance will decrease sharply.

When, as in the preferred embodiment, the traverse of the push member 36 is insufficient to force the box of chaff completely through the opening 18, this drop in frictional resistance can be utilized in a mechanism designed to eject the box of chaff completely out of the container. It can be seen by an inspection of Fig. 1 that when the shaft 20 and spider supports 24 are driven, they will rotate so push members 36 engage one of the chaff boxes 14. The high frictional resistance the box 14 that is engaged by the push members 36 offers against displacement causes the push members 36 to remain stationary while shaft 20 and spider supports 24 rotate with respect to them. This continues until springs 32 are tensioned and until guide pins 28, rotating with spiders 30, abut against the limits of the arcuate guide slots 26 on spider supports 24. This rotational displacement of the push members 36 and the spider 30 relative to spider support 24 and shaft 20 stretches springs 32 and stores potential energy in them. The length of the arm 29 of spiders 30 and the size of the push members 36 is such that the limit of the traverse of the push members 36, i.e., the nearest any push member 36 can approach to the chaff exit 19 in opening 18 in the container 12 coincides with the point at which the frictional resistance the chaff box 14 offers to displacement abruptly decreases. When that happens, the potential energy stored in spring 32 by virtue of the relative displacement of the spiders 30 and push members 36 relative to spider support 24 is returned to spider 30 and push members 36 causing them to rotate rapidly with respect to spider support 24 and causing them to give the chaff box 14 a final kick which is sufficient to force it completely out of the container. It will be appreciated, of course, that the springs 32 serve as a cushioning means between the spider support 24 and the spider 30.

Continued rotation of shaft 20 carries spider 30 and push members 36 along with it and causes the push members 36 in the opening 18 to move out of the container 12 while another push member 36 rotates into a position to enter the container opening. When this happens the balance of the chaff boxes 14 in the stack in the container 12 gravitate downwardly in the container and occupy the position vacated by the chaff box just ejected. Push members 36 are freely rotatable on connecting rods 34 so that as the push members follow their circular orbit about the axis of the shaft 20 they also rotate on the connecting rods 34. This causes the force the push members exert on the box of chaff being ejected to be applied substantially in the direction the box of chaff is to be moved.

The push members shown in Figs. 1 and 2 of the drawings exemplify the preferred form of the invention, but other kinds of push members can be used without departing from the scope of this invention, such as push members mounted on the shaft of a reciprocating piston. The important thing is the provision of some energy storing means connected to the push members which will store energy during part of the dispensing cycle when resistance to displacement offered by the material being dispensed is high, and which will release this stored energy to the push members when the resistance to displacement decreases, causing the push members to kick the material completely out of the container. In addition, as seen in Fig. 1, the size of push members 36 and opening 18 is such as to permit only one box of chaff to be ejected at any instant. It is obvious, of course, that by increasing the size of the opening 18 and the size of the push members 36, any number of boxes of chaff could be ejected simultaneously.

The intervalometer indicated generally at 40, see Fig. 3, is used to control the operation of the chaff dispenser 10. It carries a plurality of cam disks 42 integrally mounted on a shaft 44, see Fig. 4. Each cam disk 42 has a plurality of raised cam surfaces 43 distributed uniformly on its periphery, see Fig. 7. Shaft 44 is rotatably journaled in bearings 46 in shaft support 48. A gear 50, also integrally mounted on shaft 44, see Figs. 4 and 5, is in mesh with a gear 52. Gear 52 is integral with a shaft 53 which is rotatably journaled on a shaft support 54, see Fig. 5, and which is driven by a motor 56, see Figs. 3 and 4.

A bank of microswitches 58, one for each cam disk 42, is positioned below the disks, see Fig. 4. A wheel 60, for each disk, rotatably mounted on a spring support 62, is mounted on each microswitch 58, and the wheels 60 are positioned so they ride on the periphery of the cam disks 42, see Fig. 12. When the wheel encounters a raised cam surface 43, spring support 62 depresses plunger 64 on the microswitch 58, closing it, see Fig. 5. The intervalometer circuit shown in Fig. 6 comprises an input 70. This leads into a main control switch 72 and on through an indicator lamp 74. From there the input current goes into a double rotary switch 76, see Figs. 3 and 6. This double rotary switch 76 comprises two spaced parallel disks 78 and 80, mounted on a stationary support 82, see Fig. 3. Disks 78 and 80 are concentric with but not connected to a shaft 84 which is rotatably journaled in intervalometer casing 41, see Fig. 3. A rotary electrical contact 88, associated with disk 78, and a rotary electrical contact 90, associated with a disk 80, are integrally mounted on to shaft 84. As seen in Fig. 6, when rotary contact 88 is set anywhere except in position 6 as indicated by pointer 85, see Fig. 8, the current will flow through disk 78 of the double rotary switch 76, and on through motor 56. This activates the motor 56 and causes the disks 42 to rotate by means of gears 52 and 50, see Fig. 5. When this happens all the microswitches are being opened and closed in accordance with the distribution and size of cam surfaces 43 on disks 42. As seen in Fig. 6, disk 80 has a plurality of separate electrical contacts 91 uniformly distributed on its periphery. Each contact is connected to a particular microswitch. When the rotary contact 90 makes contact with any particular contact 91, current flows through the particular microswitch 58 connected to that contact. As the particular rotating cam disk 42 opens and closes this microswitch 58, it actuates relay 92 and causes it to open and close in correspondence with the opening and closing of this microswitch. Relay 92 is connected to the output 100 of the intervalometer which in turn is connected to motor 22 operating the chaff dispenser. The position of pointer 85 with respect to fixed dial 87, see Fig. 8, determines which microswitch will control relay 92 and the chaff dispenser 10.

When the pointer is in position 6, as indicated by pointer 87, rotary switch 88 on disk 78 is not connected to motor 56. This causes motor 56 and disks 42 to stop rotating and causes indicator light 76 to go out. In this position rotary switch 90 in disk 80 is connected directly to relay 92, closing it, and causing the chaff dispenser to continuously operate. If it is desired then to test indicator light 74 when motor 56 is not operating, a short circuiting switch 98, see Fig. 6, is provided. Fig. 7 is a table showing a typical distribution of cams on a typical cam disk. For example, cam number 1 has cams large enough to actuate the chaff dispenser to kick out only one box of chaff during the period in which it is in operation. These cams are distributed along the periphery as indicated by the off time column. Cam disk number 2 opens and closes its microswitch fifty-five times per revolution and holds it open through a cam arc length of 1.54°. This might be sufficient to actuate the cam dispenser long enough to eject five boxes of chaff in any particular interval, etc. These cam disks 42 are detachably mounted on shaft 20 so various combinations of cam disks can be substituted for those already in place. It is, of course, obvious that the intervalometer can be designed to rotate any number of cam disks simultaneously instead of only the five shown if greater flexibility of control is desired. The units remaining indicator 96, see Fig. 8, is of standard design and is frequently useful to inform the operator of the chaff dispenser about the supply of chaff available. It can be an ordinary counter designed to indicate each time a box of chaff or group of boxes of chaff leave the container.

The wing tank container indicated generally as 110 in Fig. 9 comprises a cylindrical center section 112 and a conical front end section or cap 114 and a conical rear section 116. The front and rear sections are removably secured to the center section 112 by any standard quick release clamping means. Runners 118 extending substantially the length of the center section are secured by welding, for example, to runner support brackets 120 mounted in the center section, see Fig. 11. These runners are adapted to slidably receive at least one complete chaff dispenser 10. Standard quick release locking means, not shown, hold the complete chaff dispensers in their proper condition in the container. As seen in Fig. 9, the center section 112 is adapted to slidably receive two complete chaff dispensers, and chaff is ejected at the openings 122 at the front of section 112 and at opening 124 at the rear of section 112. Sections 114 and 116 are standard but the center section 112 may come in various lengths depending on the size of the airplane and the projected mission. The intervalometer 40 may be more or less permanently mounted in the end sections, for example, section 114, as shown in Fig. 9.

The advantage in using a chaff dispenser container provided with means for the quick and easy removal of the complete chaff dispenser lies in the speed with which a plane returning from a chaff dispensing mission can be resupplied with chaff and made ready for another mission. Since the amount of chaff dropped in a radar deception mission is very large, it is much more difficult and time consuming to refill chaff dispenser magazines which are permanently installed in the airplane than replacing a complete chaff dispenser having an exhausted magazine, with one having a fully loaded magazine.

In addition to having means for the quick removal and quick replacement of complete chaff dispensers, the wing tank is provided with fluid utilizing means for aiding in the ejection of chaff from the chaff dispensers and from the wing tank. This is accomplished by constructing air intake ports 126 and 128 in the front section 114 of the wing tank, see Figs. 9 and 10. These ports act to raise the air pressure in the wing tanks when the plane is in flight. When this happens incoming air rammed into the wing tank with great force encounters deflectors 130 and 132 in section 12 and is thereby directed through exit passages 134 and 136. As packages of chaff are ejected from the dispenser they enter these passages and are blown out of the wing tank. To further increase the effectiveness of the air stream blowing chaff out of the wing tank container, the surfaces 138 and 140 on the container adjacent the openings 122 and 124 of the exit passages is shaped according to standard aerodynamic procedures, so that the rapid passage of the wing tanks through the air creates a vacuum at these openings. This vacuum cooperating with the air flowing through the exit passages 134 and 136 cause the chaff to be ejected with great force, and further prevents the chaff from clogging the exit passages, causing the chaff dispensers to jam. Any excess air in the wing tanks may be bled out through port 142 in section 116 provided for that purpose.

This invention has been described in a preferred form only for purposes of illustration and not restriction. Obviously, many modifications and variations of the present invention are possible in the light of the above teachings. It is, therefore, to be understood that the invention may be practiced otherwise than as specifically described and still remain within the scope of the appended claims.

I claim:

1. An apparatus for displacing an object a predetermined distance when the object is subjected to a frictional resistance that decreases after the object is displaced a certain portion of the predetermined distance comprising pushing means having a traverse less than the distance the object is to be displaced, said pushing means operable to abut and displace said object, means connected to said pushing means for storing a portion of the energy supplied to it when it is being actuated, the stored energy being released and applied to said pushing means to cause it to move and kick said object the balance of said predetermined distance by the removal of the frictional resistance the object offers to displacement, said pushing means including two concentrically mounted relatively movable elements, one of said elements being rigidly secured to a drive shaft, the other of said elements mounted on and being rotatable with respect to said drive shaft and adapted to engage the object to be displaced, said force means causing said elements to be displaced with respect to each other when said object is displaced, said energy storing means connected to each of said elements and resisting the relative displacement of the elements so that the energy stored is proportional to the displacement of the elements with respect to each other.

2. The apparatus set forth in claim 1 wherein said energy storing means comprises a spring.

3. An apparatus for dispensing units of material which are subject to a frictional resistance that decreases after they are moved a certain distance comprising a support, an upstanding container for holding a stack of units of the material to be dispensed mounted on said support, said container having a dispensing opening at the bottom sufficiently large to permit a predetermined number of the units of the material being dispensed to pass through at any instant, pushing means mounted on said support, said pushing means including a push member mounted to enter the container and contact the lowermost predetermined number of units of material in the stack and operable to push these units of material in the stack toward the opening in the container, said push member having a traverse insufficient to push these units of material completely through the opening in the container, energy storing means connected to said push member for storing a portion of the energy supplied to it when it is operating, said energy storing means operable to release said stored energy to said push member when the frictional resistance to displacement offered by the units of material being dispensed decreases causing said push member to move and kick said units of material a distance sufficient to force them completely through said opening, means for moving said push member out of the container after the predetermined number of units contacted by said push member have been forced out of the container, to permit the balance of units of material in the stack to gravitate downwardly and occupy the position vacated by the material that has been dispensed, said pushing means comprises a shaft rotatably journaled in said support, driving means connected to said shaft for rotating it, a pair of identical spider supports integrally mounted on said shaft in spaced relation thereto, identical spiders rotatably connected to each of said spider supports, connecting rods in spaced parallel relation to said shaft rigidly connected to corresponding arms on each spider to cause the spiders to rotate together, push members freely rotatable on said connecting rods and coaxial therewith, energy storing means connected between said spider supports and said spiders, said spider supports and said spiders adapted to be rotatably displaced with respect to each other when any of said push members is forced against the material being displaced, said energy storing means storing energy in proportion to the rotational displacement of the spider supports relative to the spiders.

4. The apparatus set forth in claim 3 wherein said energy storing means comprises a spring, said spring connected to said spider and to said spider support.

5. The invention set forth in claim 3 including guide slots in said spider supports, guide pins rigidly connected to an arm of the spider and riding in said guide slots, said energy storing means comprising a spring connected between said spider and said spider support.

6. A packaged chaff dispenser comprising a container for holding packages of chaff, a device for dispensing said packages in two stages, said device comprising means for pushing a unit of said packages of chaff a distance insufficient for complete dispensing of said unit, means for applying sudden force for kicking said unit out of said container, a driven shaft, spider supports rigidly mounted on said shaft to rotate with said shaft, a spider member having a plurality of arms and rotatably mounted on said shaft, arcuate slots in said spider supports; pins mounted on said spider member and engaging said slot, springs comprising cushioning and energy storing means secured at an end of each to said pins and at the remaining end of each to said spider support, push means mounted on each of said arms, the travel of said push means being retarded and cushioned relative to the movement of said shaft and spider support, the path of travel of each of said push means being only a portion of the distance necessary for completing the dispensing operation but sufficient to push the package beyond the supporting edge to a point where weight and frictional resistance diminishes sharply, the diminishing of said weight and frictional resistance acting to release the stored energy in said spring and give the package a final kick.

7. A packaged chaff dispenser comprising a container for holding packages of chaff to be dispensed, the rear wall and floor of said container being provided with communicating openings for dispensing the lowermost unit of packages from said container in two stages, the last stage being a propulsion kick implemented by the decrease of frictional resistance which the package offers to displacement, said means comprising a rotary drive shaft, a spider support rigidly mounted on said drive shaft for rotation with it, a spider on said drive shaft mounted for rotation relative thereto, a cushioned connection between said spider and said spider support affording cushioned relative relation movement therebetween for storing energy, radially extending arms on said spider, a pusher mounted on each arm adapted to enter the opening in the rear wall and floor of said container, and push a unit of packages a distance less than the path of travel required for complete dispensing of said unit but sufficient to reach the point of diminution of frictional resistance, the movement of said spider lagging behind the movement of said spider support during the first stage of travel, and providing a final kick for the final freeing of said unit from said dispenser.

8. A wing tank, air intake ports on said wing tank to provide an airstream through said tank, runners and supports in said wing tank for expediting placing and removal of the chaff dispenser, exit passages shaped to produce a vacuum, a chaff dispenser slidable on said runners, a chaff container on said chaff dispenser provided with openings in the rear wall and floor thereof for admitting pushing means, said chaff container being provided also with an egress opening contiguous to and communicating with said air stream, force means for dispensing chaff packages in two stages comprising a spider support, a spider mounted thereon for a limited rotary movement with respect thereto, cushion means for cushioning said rotary movement, pushing means on said spider capable of entering the opening in the rear wall of said chaff dispenser and propelling said chaff package toward said egress opening, the frictional resistance offered by the chaff package causing relative rotary displacement of said spider and spider support and consequent storing of energy in said cushion means, said energy being released as the frictional resistance offered by the chaff package decreases so that the chaff package is given a final kick out into the airstream.

References Cited in the file of this patent

UNITED STATES PATENTS

| | | |
|---|---|---|
| 530,148 | Williams | Dec. 4, 1894 |
| 1,228,281 | Barrett | May 29, 1917 |
| 2,539,816 | Denlinger | Jan. 30, 1951 |
| 2,719,528 | Gabrielson | Oct. 4, 1955 |
| 2,720,338 | Kovac | Oct. 11, 1955 |

FOREIGN PATENTS

| | | |
|---|---|---|
| 137,399 | Germany | Apr. 25, 1934 |
| 579,259 | Great Britain | July 29, 1946 |